(12) United States Patent
Myeong et al.

(10) Patent No.: US 9,912,764 B2
(45) Date of Patent: Mar. 6, 2018

(54) METHOD AND APPARATUS FOR ROBUST LOCALIZATION IN OUTDOOR ENVIRONMENTS

(71) Applicant: Korea Advanced Institute of Science and Technology, Daejeon (KR)

(72) Inventors: Hyeon Myeong, Daejeon (KR); Taekjun Oh, Daejeon (KR); Hyongjin Kim, Daejeon (KR); Kwang-yik Jung, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 107 days.

(21) Appl. No.: 15/153,181

(22) Filed: May 12, 2016

(65) Prior Publication Data

US 2017/0048816 A1 Feb. 16, 2017

(30) Foreign Application Priority Data

Jun. 11, 2015 (KR) .......................... 10-2015-0082774

(51) Int. Cl.
*H04W 24/00* (2009.01)
*H04L 29/08* (2006.01)
*G06T 7/73* (2017.01)

(52) U.S. Cl.
CPC ............... *H04L 67/18* (2013.01); *G06T 7/75* (2017.01); *G06T 2200/04* (2013.01); *G06T 2207/10028* (2013.01); *G06T 2207/20072* (2013.01)

(58) Field of Classification Search
None
See application file for complete search history.

(56) References Cited

U.S. PATENT DOCUMENTS

| | | | |
|---|---|---|---|
| 8,705,893 B1* | 4/2014 | Zhang | G06K 9/00201 345/418 |
| 8,786,680 B2* | 7/2014 | Shiratori | G06F 3/011 345/156 |
| 2016/0023352 A1* | 1/2016 | Kennedy | B25J 9/06 700/259 |

* cited by examiner

*Primary Examiner* — Erika Washington
(74) *Attorney, Agent, or Firm* — John V. Daniluck; Bingham Greenebaum Doll LLP

(57) ABSTRACT

A method and apparatus for robust localization in outdoor environments is provided. The localization method includes the steps of receiving scanner data from localization means and receiving angle information of a mobile device from an angle sensor, correcting the scanner data based on the received angle information, performing an Iterative Closest Point (ICP) mechanism for the corrected scanner data and generating a first constraint, and localizing the mobile device based on a graph structure under the first constraint.

20 Claims, 9 Drawing Sheets

METHOD AND APPARATUS FOR ROBUST LOCALIZATION IN OUTDOOR ENVIRONMENTS

CROSS-REFERENCE TO RELATED APPLICATION(S)

This application claims the benefit under 35 U.S.C. § 119(a) of a Korean patent application filed on Jun. 11, 2015 in the Korean Intellectual Property Office and assigned Serial number 10-2015-0082774, the entire disclosure of which is hereby incorporated by reference.

TECHNICAL FIELD

Some embodiments of the present disclosure relate to a method and apparatus for robust localization in outdoor environments and more particularly, to a method and apparatus for robust localization even in outdoor environments by recognizing or estimating a location of a mobile device through an Iterative Closest Point (ICP) algorithm using angle information and a Simultaneous Localization And Mapping (SLAM) algorithm based on a graph structure.

BACKGROUND

Industrial robots iteratively perform the same works at fixed locations. Field robots perform various works in diverse environments. Those field robots are emerging along with development of robot technology in recent years. As field robots work in diverse environments, there are many problems to be overcome for robot automation. One of principal issues for field robot automation is to solve a problem of robot self-localization. For robot self-localization, there have been proposed the wide extent of sensors and algorithms. A Global Positioning System (GPS) and an Inertial Measurement Unit (IMU) are employed for positioning sensors. A Visual Odometry (VO) algorithm using a camera image and an ICP algorithm using a laser scanner are employed for obtaining a location of a robot. However, a critical positional error may appear because a GPS signal cannot be received from a satellite under the condition of non-line-of-sight. In the case of using IMU and VO algorithms for a long term, errors could be accumulated. Furthermore, an ICP algorithm could cause an error in the case of processing uneven surface data. A SLAM algorithm may be helpful to solve such problems.

SUMMARY

Aspects of the present disclosure are to address at least the above-mentioned problems and/or disadvantages and may provide some advantages described below. Accordingly, some embodiments of the present disclosure are to provide a method and apparatus for robust localization even in outdoor environments by recognizing or estimating a location of a mobile device through an ICP algorithm using angle information and an SLAM algorithm based on a graph structure.

Some embodiments of the present disclosure are to provide a method and apparatus capable of improving the accuracy of localization for a mobile device by additionally considering a feature matching on a 3D modeling map.

In accordance with an aspect of the present disclosure, a localization method may include receiving scanner data from localization means and receiving angle information of a mobile device from an angle sensor, correcting the scanner data based on the received angle information, performing an ICP mechanism for the corrected scanner data and generating a first constraint, and localizing the mobile device based on a graph structure under the first constraint.

Additionally, the localization method may further include obtaining odometry information of the mobile device and generating a second constraint based on the obtained odometry information, wherein localizing may comprise localizing the mobile device based on the graph structure under the first constraint and the second constraint.

Generating the first constraint may include generating the first constraint if the number of the scanner data is equal to or larger than a specific threshold.

Generating the first constraint may include generating the first constraint if a moving direction of the mobile device agrees on an Ackeman steering condition.

Localizing may include localizing the mobile device based on the graph structure only under the second constraint without the first constraint if a difference between a mobile-device moving distance calculated through the ICP process and a mobile-device mobbing distance calculated through the odometry information is equal to or larger than a specific difference value.

Correcting the scanner data may include performing homogeneous transformation of the scanner data using the angle information and correcting the scanner data.

Additionally, the localization method may further include matching a previously built 3D modeling map with the corrected scanner data, wherein localizing may include localizing the mobile device based on a graph-structure-based resultant value and a feature matching resultant value.

Localizing may include adjusting weight values of the graph-structure-based resultant value and the feature matching resultant value and localizing the mobile device.

Correcting the scanner data may include correcting the scanner data using a roll angle and a pitch angle of the mobile device that are calculated by the angle sensor.

Localizing may include localizing the mobile device using a graph-structure-based SLAM mechanism.

In accordance with another aspect of the present disclosure, a localization apparatus may include an ICP execution part receiving scanner data from localization means, receiving angle information of a mobile device from an angle sensor, correcting the scanner data based on the received angle information, performing an ICP mechanism for the corrected scanner data, and generating a first constraint, and a localization part localizing the mobile device based on a graph structure under the first constraint.

Additionally, the localization apparatus may further include an encoder to obtain odometry information of the mobile device, wherein the localization part may generate a second constraint based on the obtained odometry information, and localizes the mobile device based on the graph structure under the first constraint and the second constraint.

The ICP execution part may generate the first constraint if the number of the scanner data is equal to or larger than a specific threshold.

The ICP execution part may generate the first constraint if a moving direction of the mobile device agrees on an Ackeman steering condition.

The localization part may localize the mobile device based on the graph structure only under the second constraint without the first constraint if a difference between a mobile-device moving distance calculated through the ICP process and a mobile-device mobbing distance calculated through the odometry information is equal to or larger than a specific difference value.

The ICP execution part may perform homogeneous transformation of the scanner data using the angle information and may correct the scanner data.

Additionally, the localization apparatus may further include a feature matching part to match a previously built 3D modeling map with the corrected scanner data, wherein the localization part may localize the mobile device based on a graph-structure-based resultant value and a feature matching resultant value.

The localization part may adjust weight values of the graph-structure-based resultant value and the feature matching resultant value and may localize the mobile device.

The ICP execution part may correct the scanner data using a roll angle and a pitch angle of the mobile device that are calculated by the angle sensor.

The localization part may localize the mobile device using a graph-structure-based SLAM mechanism.

According to some embodiments of the present disclosure, it may be accomplishable to perform robust localization even in outdoor environments by recognizing or estimating a location of a mobile device through an ICP algorithm using angle information and an SLAM algorithm based on a graph structure.

According to some embodiments of the present disclosure, it may be allowable to improve the accuracy of localization for a mobile device by additionally considering a feature matching on a 3D modeling map.

According to some embodiments of the present disclosure, it may be allowable to improve the accuracy of localization in the fields of mobile robot localization, unmanned automobile localization, outdoor localization, and so on.

According to some embodiments of the present disclosure, it may be advantageous to cost because a laser scanner is used without an expensive device such as velodyne.

According to some embodiments of the present disclosure, it may be allowable to exactly perform localization even on an uneven surface of a road having a speed control hump or porthole.

DETAILED DESCRIPTION

Figure 1:
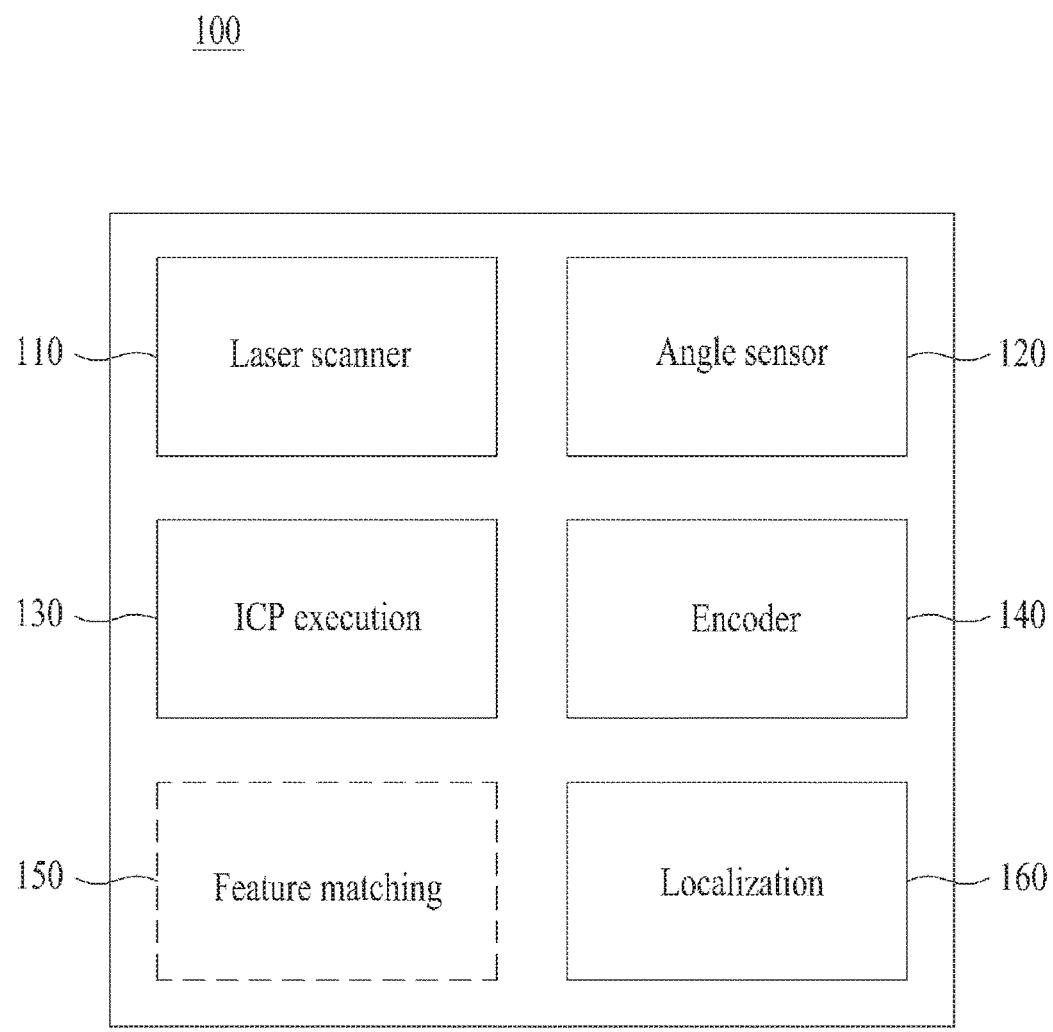
FIG. 1 illustrates a configuration of a localization apparatus according to according to an embodiment of the present disclosure.

Hereinafter, various embodiments of the present disclosure will be described in conjunction with the accompanying drawings. Various embodiments described herein, however, may not be intentionally confined in specific embodiments, but should be construed as including diverse modifications, equivalents, and/or alternatives. With respect to the descriptions of the drawings, like reference numerals refer to like elements.

A localization algorithm using a matching (scan matching) with distance information extracted from a laser scanner and with a previously built mapping model may be performed without considerable troubles in indoor environments. However, as outdoor environments, different from indoor environments, would be conditioned with speed control humps or portholes (local holes on the surfaces of asphalt-paved roads) to cause uneven or bent ground surfaces, a laser scanner attached to a mobile robot or an unmanned automobile can be greatly fluctuated to generate highly erroneous data and thereby the same manner with indoor environments may be hardly applied to such outdoor environments.

Embodiments of the present disclosure may be arranged to robust localization for a mobile device in outdoor environments by employing an ICP algorithm with angle information and by employing an SLAM algorithm based on a graph structure.

Moreover, embodiments of the present disclosure may additionally consider a feature matching of a 3D modeling map to improve localization accuracy for a mobile device.

Figure 2:
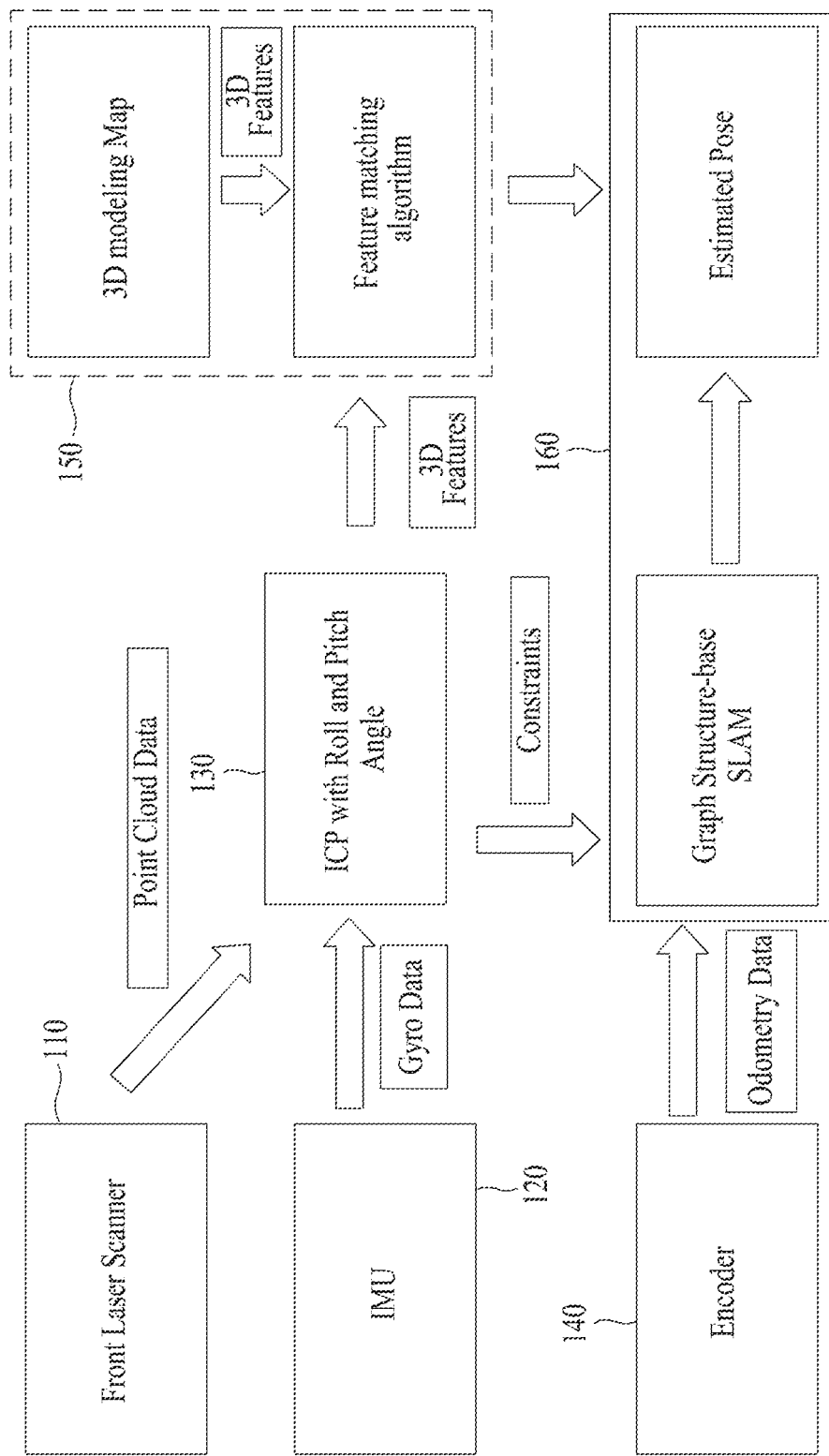
FIG. 2 exemplarily illustrates a mechanism of a localization apparatus shown in FIG. 1.

FIG. 1 illustrates a configuration of a localization apparatus according to according to an embodiment of the present disclosure, and FIG. 2 exemplarily illustrates a mechanism of a localization apparatus shown in FIG. 1.

Referring to FIGS. 1 and 2, a localization apparatus 100 according to an embodiment of the present disclosure may include a laser scanner 110, an angle sensor 120, an ICP execution part 130, an encoder 140, a feature matching part 150, and a localization part 160. The localization apparatus 100 may be attached to a mobile device and may localize the mobile device.

The laser scanner 110, corresponding to a configuration for a front laser scanner, may be attached to a mobile device to provide the ICP execution part 130 with scanner data (point cloud data) which are collected through a laser scanning.

Figure 3:
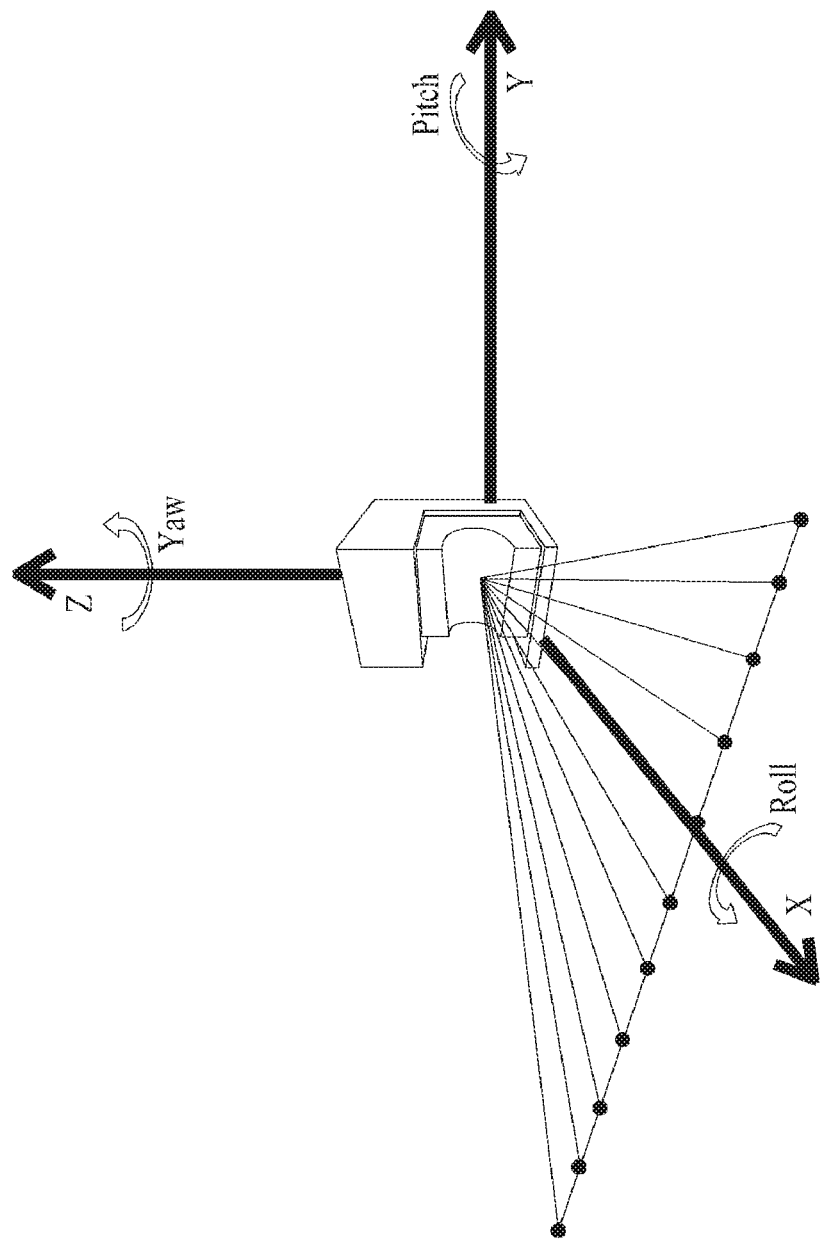
FIG. 3 exemplarily illustrates a laser scanner according to embodiments of the present disclosure.

The laser scanner 110 may cooperate with the axes of X, Y, and Z as shown in FIG. 3. An angle of the X-axis (roll angle), an angle of the Y-axis (pitch angle), and an angle of the Z-axis (yaw angle) in the laser scanner 110 may be variable dependent on a surface state in a moving route of a mobile device.

Embodiments of the present disclosure may not be restrictive to the laser scanner 110 and rather may be applicable to all kinds of distance measuring means.

The angle sensor 120, as a sensor for measuring an angle, such as IMU, may measure angles according to moves of a mobile device and may provide information of the angles (i.e., gyro data) to the ICP execution part 130.

During this the angle sensor 120 may measure at least one or more of a roll angle, a pitch angle, and yaw angle and may provide the measured angle information to the ICP execution part 130.

The ICP execution part 130, as a configuration for ICP with roll and pitch angles, may receive scanner data from the laser scanner 110, may receive angle information of a mobile device from the angle sensor 120, may correct the scanner data based on the received angle information, and may perform an ICP operation with the corrected scanner data to generate a first constraint.

During this, the ICP execution part 130 may correct a distorted angle of the laser scanner by using angles, e.g., roll and pitch angles, which are obtained through the angle sensor such as IMU. The ICP execution part 130 may perform homogeneous transformation of scanner data using angle information and then may correct a distorted angle of the laser scanner to correct the scanner data.

ICP, as a mechanism for matching a previously built map and newly measured data each other in the minimum error, may be employed to calculate displacement, e.g., an X-axis coordinate value, a Y-axis coordinate value, and an angle of a moving direction.

The ICP execution part 130 may generate an ICP resultant value by performing an ICP operation with scanner data which is corrected by angle information, and then the generated ICP resultant value may be used as the first constraint of the graph structure.

To prevent positional errors from increasing due to wrong constraints, the ICP execution part 130 may take the following constraints into account when generating the first constraint using ICP.

For example, in the case that the number of scanner data is smaller than a specific threshold, i.e., in the case that the number of scanner data is too small, the ICP execution part 130 may not generate the first constraint because errors of ICP results become larger. In other words, the ICP execution part 130 may generate only in the case that the number of scanner data is equal to or larger than a specific threshold.

For another example, the ICP execution part 130 may generate the first constraint in the case that a moving direction of a mobile device agrees on the Ackeman steering condition. A mobile device according to embodiments of the present disclosure may be impossible to laterally move because the mobile device can accord to the Ackeman steering condition that is a kind of automobile moving model. Accordingly, the ICP execution part 130 may not generate in the case of disagreeing on the Ackeman steering condition.

Additionally, in the case that a localization apparatus according to embodiments of the present disclosure includes the feature matching part 150, the ICP execution part 140 may features of corrected scanner data to the feature matching part 150.

The encoder 140 may obtain odometry information of a mobile device and may provide the obtained odometry information to the localization part 160.

The encoder 140 may detect a rotation speed and a rotation direction of an electromotive wheel of a mobile device, and may obtain odometry information of the mobile device from the detected rotation speed and the detected rotation direction.

The feature matching part 150, as a configuration for a feature marching algorithm, may match 3D features of a previously built 3D modeling map with 3D features of corrected scanner data, and may provide the matching result to the localization part 160.

During this, the feature matching part 150 may extract 3D features from a 3D modeling map, and may provide the localization part 160 with matching resultant values for 3D features of the extracted 3D features and the corrected scanner data. The matching resultant values may be digitized values for accuracy of feature matching.

The feature matching part 150 may be selectively configured in the localization apparatus 100. In the case that the localization part 160 performs localization for a mobile device only based on a graph structure, the feature matching part 150 may be removed therefrom. As a matter of course, in the case that the feature matching part 150 is formed therein, the localization part 160 may localize a mobile device from graph-structure-based resultant values and feature matching resultant values. This will be described later with relevant to the localization part 160.

The localization part 160, as a configuration for graph-structure-based SLAM and estimated pose, may localize a mobile device.

The localization part 160 may operate with a mobile-device localization process which is variable dependent on presence or absence of the feature matching part 150. Such a localization process for a mobile device will be divisionally described for 1) the case only based on a graph structure, and 2) the case using graph-structure-based results and feature matching results.

1) Mobile Device Localization Based on Graph Structure Only

The localization part 160 may generate a second constraint based on odometry information which is received from the encoder 140, and may localize a mobile device based on a graph structure under the first constraint, which is received from the ICP execution part 130, and under the generated second constraint.

The localization part 160 may even localize a mobile device based on a graph structure only under the first constraint.

The localization part 160 may calculate a moving displacement value using odometry information and may even adopt the calculated moving displacement value for the second constraint of graph structure.

The localization part 160 may localize a mobile device by using a graph-structure-based SLAM with the first constraint and the second constraint.

The localization part 160 may localize a mobile device by correcting a localization value of a mobile device through graph optimization for a generated graph structure and by calculating the final displacement of the mobile device through a graph-structure-based SLAM.

Figure 4:
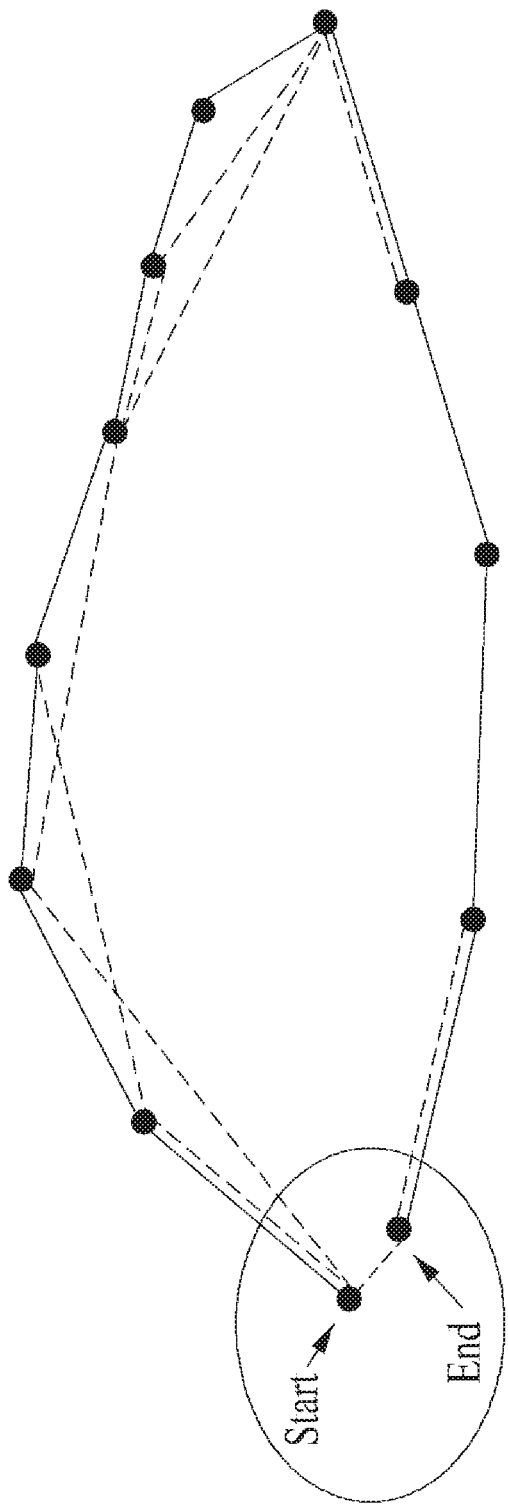
FIG. 4 exemplarily illustrates an execution result according to embodiments of the present disclosure.

Referring to FIG. 4, a graph structure may include nodes representing locations indicated by blue dots, and edges representing constraints between nodes indicated by black lines. In FIG. 4, black solid lines mean a mobile-device moving displacement calculated from an odometry and black broken lines mean mobile-device moving displacement calculated from ICP. As can be seen from FIG. 4, a constraint (red broken line) may be generated through loop closing by ICP when a mobile device returns to a location adjacent to the start location, e.g., the end location, but may not be generated in a mode through an odometry. This is caused from a large error of odometry information, such as a slip, and moving displacement of a mobile device may be compensated by ICP.

If a difference between a mobile-device moving distance calculated through ICP and a mobile-device moving distance calculated through odometry information is equal to or larger than a specific difference value, the localization part 160 may determine the information as an error and may exclude a constraint by ICP, i.e., the first constraint, from the graph structure. In other words, if a difference between a mobile-device moving distance calculated through ICP and a mobile-device moving distance calculated through odometry information is equal to or larger than a specific difference value, the localization part 160 may localize the mobile device using only the second constraint except the first constraint.

As such, the localization part 160 according to embodiments of the present disclosure may improve the accuracy of localization for a mobile device through ICP according to angle correction of scanner data and SLAM based on a graph structure. This will be described below in conjunction with FIGS. 6 to 7.

Figures 5A, 5B:
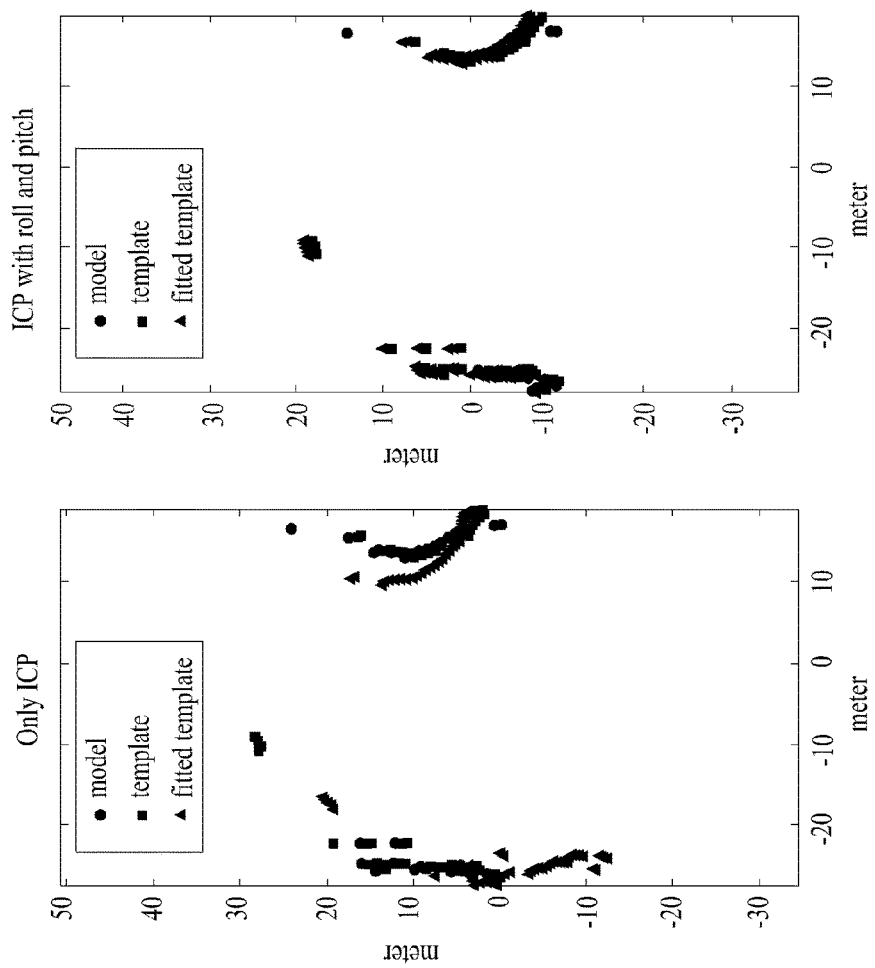
FIG. 5A exemplarily shows ICP (only) results.
FIG. 5B shows ICP results with angular correction.

FIGS. 5A and 5B exemplarily show ICP results before and after correcting angles (respectively), representing an ICP result (only ICP) corrected in scanner data with angle information and an ICP result (ICP with roll and pitch) corrected in scanner data with angle information.

In FIGS. 5A and 5B, red dots (model) indicate the laser scanner's distance information obtained from a previous frame, green dots (template) indicate the laser scanner's distance information obtained from a current frame, and blue dots indicate positional information of an ICP result. As can be seen from FIGS. 5A and 5B, while the ICP-only result uncorrected with IMU angle information may be seen as having errors without overlap of the red and blue dots, the other ICP result (ICP with roll and pitch) corrected with IMU angle information may be seen as having overlap of red and blue dots without an error. This results from proper execution of ICP.

Figure 6:
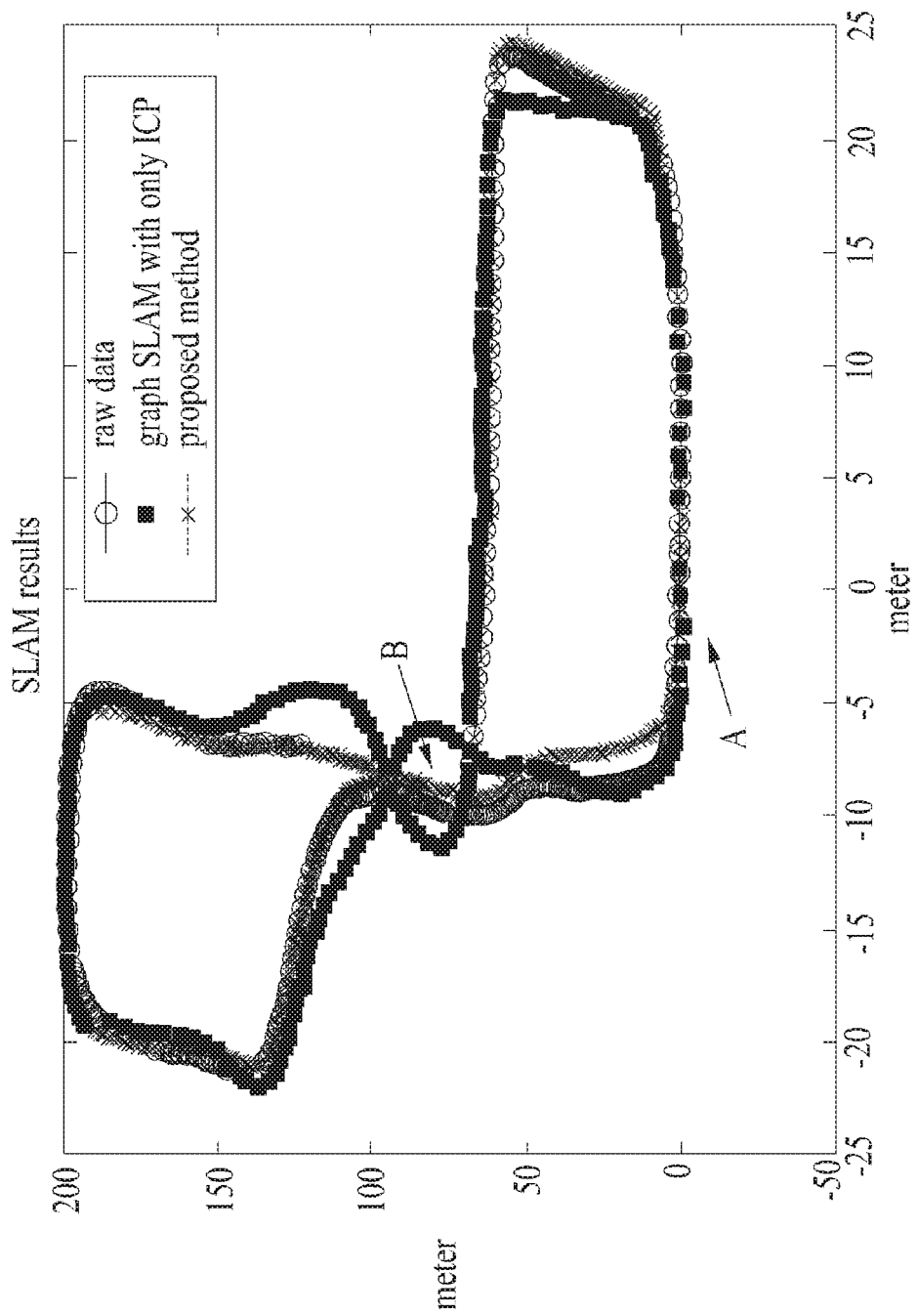
FIG. 6 exemplarily shows an execution result according to embodiments of the present disclosure.
Figure 7A:
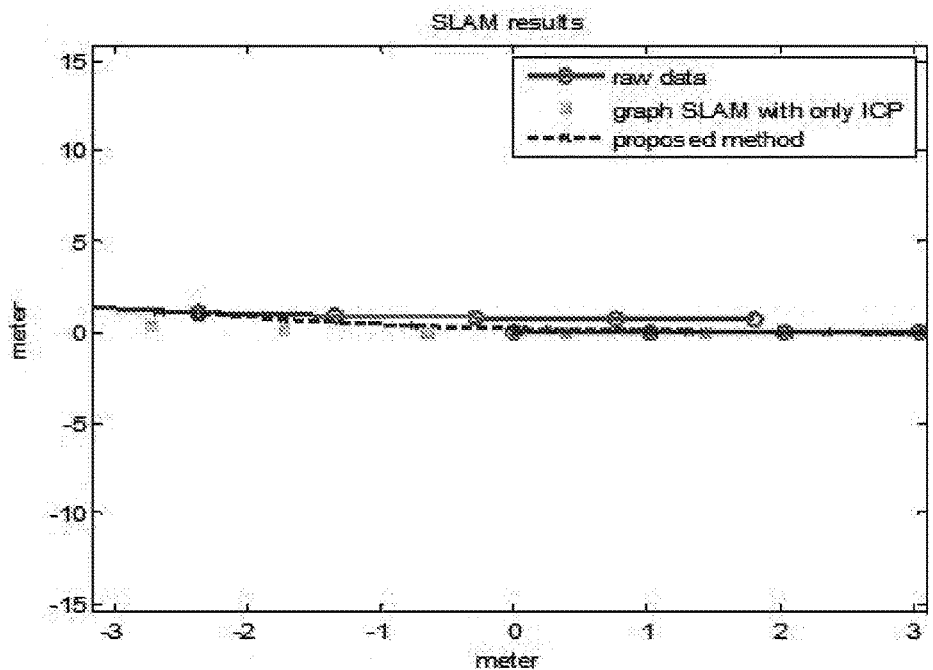
FIGS. 7A and 7B show the sections A and B shown in FIG. 6.
Figure 7B:
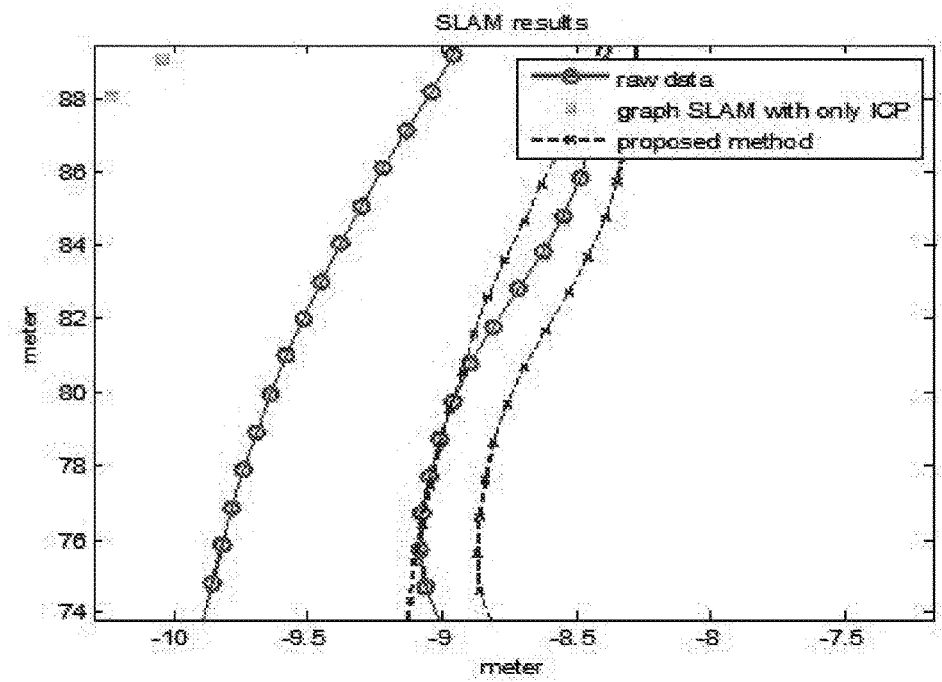

FIG. 6 exemplarily shows an execution result according to embodiments of the present disclosure, and FIGS. 7A and 7B show the sections A and B shown in FIG. 6.

FIGS. 6, 7A, and 7B show a result of obtaining trajectories of a mobile device. In FIGS. 6, 7A, and 7B, a red line (raw data) indicates a trajectory of the mobile device using only an odometry, a green line (graph SLAM with only ICP) indicates a graph-structure-based SLAM result using an ICP constraint without consideration of angle information, and a blue line (proposed method) indicates a graph-structure-based SLAM result using an ICP constraint corrected under consideration of IMU angle information.

As shown in FIG. 6, it can be seen from the green line of the section B that there are failed with a wrong constraint generated by ICP because angle errors due to effects of outdoor environments has not been corrected.

Additionally, it can be seen from results of the section A shown in FIG. 7A that the blue line as a result according to an embodiment of the present disclosure is overlaid thereon. This is because a constraint is generated due to occurrence of loop closing through ICP. A mobile-device localization result with an odometry is seen as being gone out of the route about 1 m due to accumulation of errors because the odometry system does not generate a constraint.

Additionally, it can be seen from results of the section B shown in FIG. 7B that a result using an embodiment of the present disclosure is more accurate than a result using an odometry.

2) Mobile Device Localization Using Graph-Structure-Based Result and Feature Matching Result The localization part 160 may localize a mobile device with reference to a feature matching result and a graph-structure-based result under the first constraint and the second constraint.

A graph-structure-based result may be referred to the former description of '1) Mobile device localization based on graph structure only' and so will not be further described.

The localization part 160 may localize a mobile device by adjusting a weight value to a feature matching resultant value and a graph-structure-based resultant value.

For example, the localization part 150 may detect an angle variation from angle information of IMU on a graph structure. If an angle variation becomes out of a specific range, the localization part 160 may localize a mobile device by increasing a weight value to a feature matching resultant value more than a weight value to a graph-structure-based resultant value.

For another example, the localization part 160 may localize a mobile device by digitizing the accuracy for feature matching and by adjusting weight values of a graph-structure-based resultant value and a feature matching resultant value with a specific weight value according to the digitized value.

As such, by recognizing or estimating a mobile device through an graph-structure-based SLAM algorithm and an ICP algorithm using angle information, a localization apparatus according embodiments of the present disclosure may perform robust localization even in outdoor environments with an uneven surface of a speed control hump or porthole and may improve the accuracy of localization for the mobile device in additional consideration of feature matching with a 3D modeling map according to an environmental condition.

Additionally, since a localization apparatus according to embodiments of the present disclosure may complete robust localization for a mobile device in outdoor environments, it may be accomplishable to improve the accuracy of localization in the fields of mobile robot localization, unmanned automobile localization, outdoor localization, and so on. Since a localization apparatus according to embodiments of the present disclosure may operate with a laser scanner without an expensive machine such as velodyne, it may be advantageous to cost.

Figure 8:
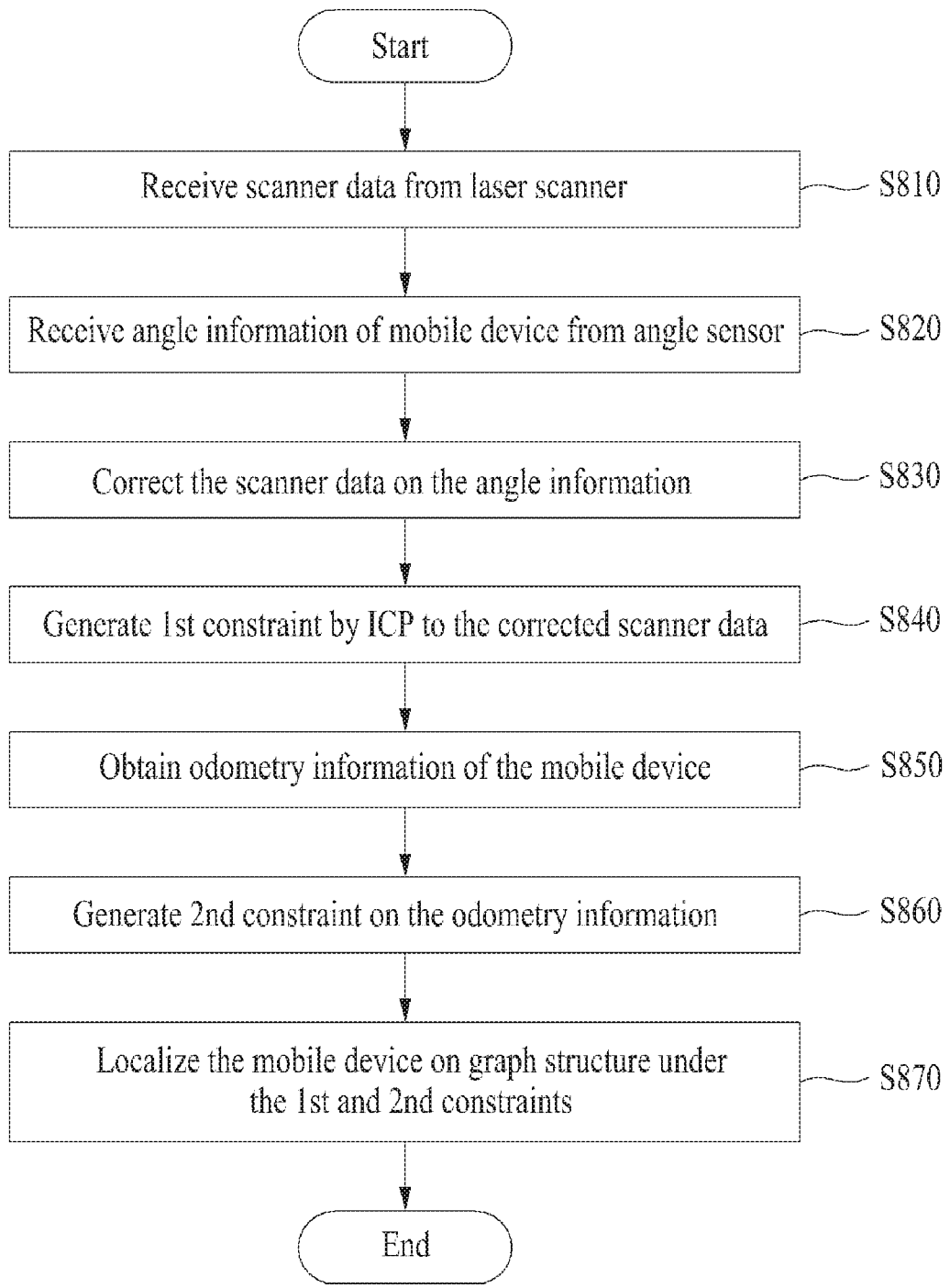
FIG. 8 is a flow chart showing a localization method according to an embodiment of the present disclosure.

FIG. 8 is a flow chart showing a localization method according to an embodiment of the present disclosure, operation steps of which are performed in the localization apparatus illustrated in FIG. 1.

Referring to FIG. 8, a localization method according to embodiments of the present disclosure may receive scanner data, which are collected by the laser scanner, from the laser scanner (S810), and may receive angle information, which is measured by the angle sensor from a mobile device, from the angle sensor (S820).

During this, the angle sensor may measure at least one of a roll angle, a pitch angle, and a yaw angle of the mobile device. The steps S810 and S820 may be even performed in sequence or in parallel.

If scanner data and angle information are received at the steps S810 and S820, the scanner data may be corrected based on the received angle information (S830) and an ICP process may be performed to generate a first constraint for a graph structure (S840).

During the step S830, a distorted angle of the laser scanner may be corrected by using angles, e.g., a roll angle and a pitch angle, which are obtained through the angle sensor, and a distorted angle of the laser scanner may be corrected to correct the scanner data by performing homogeneous transformation of the scanner data using the angle information.

To prevent a positional error increasing due to a wrong constraint, at the step S840, the following conditions may be considered when the first constraint is generated using ICP.

For example, at the step S840, since errors of ICP results increase in the case that the number of the scanner data is smaller than a specific threshold, the first constraint may not be generated. In other words, at the step S840, the first constraint may be generated only in the case that the number of the scanner data is equal to or larger than a specific threshold.

For another example, at step S840, in the case that a moving direction of the mobile device agrees on the Ackeman steering condition, the first constraint may be generated. In other words, the first constraint may not be generated in the case of disagreeing on the Ackeman steering condition.

Next, the encoder may be used to obtain odometry information of the mobile device (S850) and a second constraint may be generated for a graph structure based on the obtained odometry information (S860).

If the first constraint and the second constraint are generated through the steps S840 and S860, the mobile device may be localized based on the graph structure under the first constraint and the second constraint (S870).

During the step S870, the mobile device may be localized using a graph-structure-based SLAM under the constraint with the first constraint and the second constraint.

During the step S870, the mobile device may be also localized using a graph-structure-based SLAM only under the first constraint.

At the step S870, if a difference between a mobile-device moving distance calculated through ICP and a moving distance calculated through odometry information is equal to or larger than a specific difference value, there may be determined an error and then the mobile device may be localized based on the graph structure only under the second constraint without including the first constraint, which is the constraint taken by ICP, in the graph-structure-based constraint.

Additionally, a localization method according to embodiments of the present disclosure may localize a mobile device by additionally considering feature matching with a 3D modeling map. This will be described below in conjunction with FIG. 9.

Figure 9:
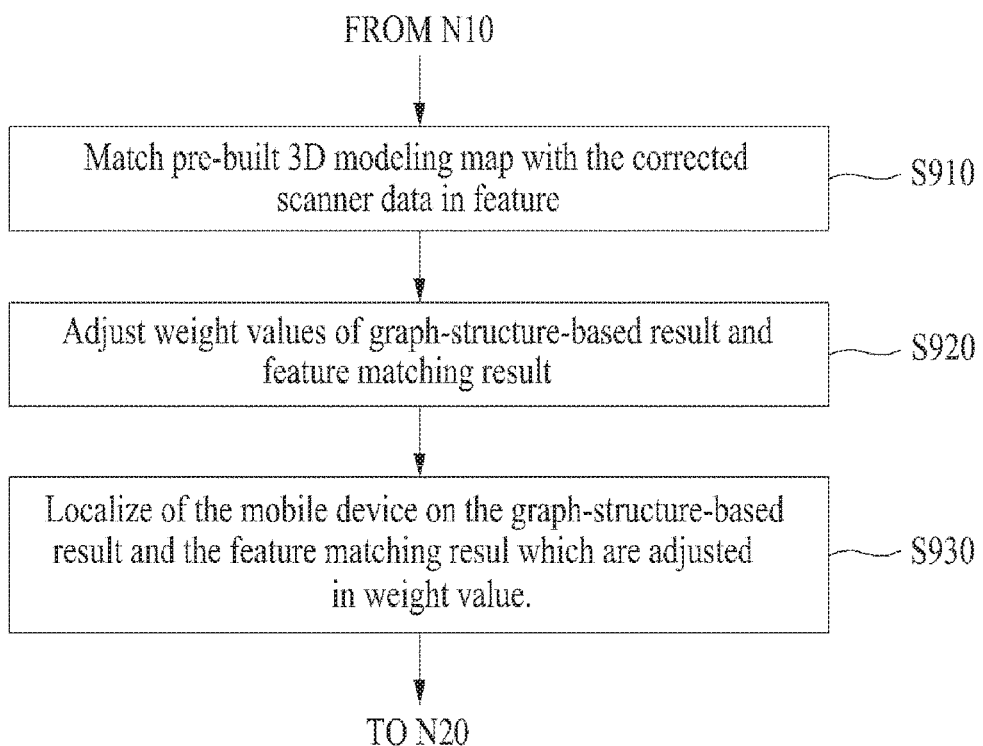
FIG. 9 is a detailed flow chart of the step S870 shown in FIG. 8 according to an embodiment of the present disclosure.

FIG. 9 is a detailed flow chart of the step S870 shown in FIG. 8 according to an embodiment of the present disclosure.

Referring to FIG. 9, at the step S870 of localizing a mobile device, a feature matching resultant value may be obtained by matching a previously built feature of a 3D modeling map with a feature of corrected scanner data (S910).

If the feature matching resultant value is obtained by the step S910, weight values to a graph-structure-based resultant value and the feature matching resultant value may be adjusted (S920) and the mobile device may be localized based on the feature matching resultant value and the graph-structure-based resultant value which are adjusted in weight value (S930).

During the step S920, an angle variation may be detected from angle information of IMU on the graph structure. If the angle variation becomes out of a specific range, it may be available to adjust the weight value to the feature matching resultant value more than the weight value of the graph-structure-based resultant value.

During the step S920, it may be allowable to adjust the weight values of the graph-structure-based resultant value and the feature matching resultant value with a specific weight value according to a range of a digitized value for feature matching.

While embodiments of the present disclosure have been shown and described with reference to the accompanying drawings thereof, it will be understood by those skilled in the art that various changes and modifications in form and details may be made therein without departing from the spirit and scope of the present disclosure as defined by the appended claims and their equivalents. For example, it may be allowable to achieve desired results although the embodiments of the present disclosure are preformed in other sequences different from the descriptions, and/or the elements, such as system, structure, device, circuit, and so on, are combined or assembled in other ways different from the descriptions, replaced or substituted with other elements or their equivalents.

Therefore, other implementations, other embodiments, and equivalents of the appended claims may be included in the scope of the appended claims.

What is claimed is:

1. A localization method comprising:
   receiving scanner data from localization means and receiving angle information of a mobile device from an angle sensor;
   correcting the scanner data based on the received angle information;
   performing an Iterative Closest Point (ICP) mechanism for the corrected scanner data and generating a first constraint; and
   localizing the mobile device based on a graph structure under the first constraint.

2. The localization method of claim 1, further comprising:
   obtaining odometry information of the mobile device and generating a second constraint based on the obtained odometry information,
   wherein the localizing comprises:
   localizing the mobile device based on the graph structure under the first constraint and the second constraint.

3. The localization method of claim 2, wherein the localizing comprises:
   localizing the mobile device based on the graph structure only under the second constraint without the first constraint if a difference between a mobile-device moving distance calculated through the ICP process and a mobile-device mobbing distance calculated through the odometry information is equal to or larger than a specific difference value.

4. The localization method of claim 1, wherein the generating of the first constraint comprises:
   generating the first constraint if the number of the scanner data is equal to or larger than a specific threshold.

5. The localization method of claim 1, wherein the generating of the first constraint comprises:
   generating the first constraint if a moving direction of the mobile device agrees on an Ackeman steering condition.

6. The localization method of claim 1, wherein the correcting of the scanner data comprises:
   performing homogeneous transformation of the scanner data using the angle information and correcting the scanner data.

7. The localization method of claim 1, further comprising:
   matching a previously built 3D modeling map with the corrected scanner data,
   wherein the localizing comprises:
   localizing the mobile device based on a graph-structure-based resultant value and a feature matching resultant value.

8. The localization method of claim 7, wherein the localizing comprises:
   adjusting weight values of the graph-structure-based resultant value and the feature matching resultant value and localizing the mobile device.

9. The localization method of claim 1, wherein the correcting of the scanner data comprises:
   correcting the scanner data using a roll angle and a pitch angle of the mobile device that are calculated by the angle sensor.

10. The localization method of claim 1, wherein the localizing comprises:
  localizing the mobile device using a graph-structure-based Simultaneous Localization And Mapping (SLAM) mechanism.

11. A localization apparatus comprising:
  an ICP execution part configured to receive scanner data from localization means, to receive angle information of a mobile device from an angle sensor, to correct the scanner data based on the received angle information, to perform an ICP mechanism for the corrected scanner data, and to generate a first constraint; and
  a localization part configured to localize the mobile device based on a graph structure under the first constraint.

12. The localization apparatus of claim 11, further comprising:
  an encoder configured to obtain odometry information of the mobile device,
  wherein the localization part generates a second constraint based on the obtained odometry information, and localizes the mobile device based on the graph structure under the first constraint and the second constraint.

13. The localization apparatus of claim 12, wherein the localization part localizes the mobile device based on the graph structure only under the second constraint without the first constraint if a difference between a mobile-device moving distance calculated through the ICP process and a mobile-device mobbing distance calculated through the odometry information is equal to or larger than a specific difference value.

14. The localization apparatus of claim 11, wherein the ICP execution part generates the first constraint if the number of the scanner data is equal to or larger than a specific threshold.

15. The localization apparatus of claim 11, wherein the ICP execution part generates the first constraint if a moving direction of the mobile device agrees on an Ackeman steering condition.

16. The localization apparatus of claim 11, wherein the ICP execution part performs homogeneous transformation of the scanner data using the angle information and corrects the scanner data.

17. The localization apparatus of claim 11, further comprising:
  a feature matching part configured to match a previously built 3D modeling map with the corrected scanner data,
  wherein the localization part localizes the mobile device based on a graph-structure-based resultant value and a feature matching resultant value.

18. The localization apparatus of claim 17, wherein the localization part adjusts weight values of the graph-structure-based resultant value and the feature matching resultant value and localizes the mobile device.

19. The localization apparatus of claim 11, wherein the ICP execution part corrects the scanner data using a roll angle and a pitch angle, of the mobile device, that are calculated by the angle sensor.

20. The localization apparatus of claim 11, wherein the localization part localizes the mobile device using a graph-structure-based SLAM mechanism.

* * * * *